United States Patent [19]
Tomida et al.

[11] Patent Number: 5,334,664

[45] Date of Patent: Aug. 2, 1994

[54] METHOD FOR PRODUCING GRAFT-MODIFIED COPOLYMERS

[75] Inventors: Masayuki Tomida; Hitoshi Nimura; Mitsutoshi Aritomi, all of Yokkaichi, Japan

[73] Assignee: Mitsubishi Petrochemical Company Limited, Tokyo, Japan

[21] Appl. No.: 54,094

[22] Filed: Apr. 30, 1993

[30] Foreign Application Priority Data

Apr. 30, 1992 [JP] Japan ................. 4-111730

[51] Int. Cl.$^5$ .................... C08F 279/00
[52] U.S. Cl. .................. 525/289; 525/285; 525/286; 525/302; 525/309; 525/317
[58] Field of Search ......... 525/285, 286, 289, 302, 525/303, 309, 317

[56] References Cited

U.S. PATENT DOCUMENTS 5,059,658 10/1991 Sezume et al. ............ 525/301
5,153,270 10/1992 Roncetti et al. ............ 525/289

FOREIGN PATENT DOCUMENTS 0268985 6/1988 European Pat. Off. .

*Primary Examiner*—Vasu S. Jagannathan
*Attorney, Agent, or Firm*—Oblon, Spivak, McClelland, Maier & Neustadt

[57] ABSTRACT

A method for producing a graft-modified copolymer comprising the step of subjecting 100 parts by weight of an unsaturated copolymer comprising an α-olefin of 3 to 12 carbon atoms and a cyclic olefin represented by the following formula (I), and 0.1 to 300 parts by weight of a radically polymerizable monomer to the radical polymerization conditions:

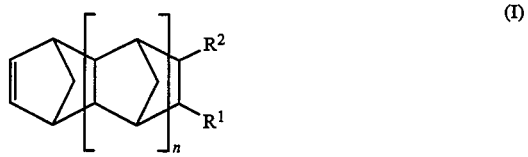

(I)

wherein $R^1$ is a $C_{2-5}$ alkylidene group or a $C_{2-5}$ alkenyl group, $R^2$ is a $C_{1-5}$ hydrocarbon radical or H, and n is 0, 1 or 2.

The graft-modified copolymer is imparted with various properties which are attributed to the polymer chain formed from the radically polymerizable monomer, without the excellent properties inherent in an α-olefin polymer being impaired. The copolymer is excellent in compatibility with other resins.

19 Claims, No Drawings

METHOD FOR PRODUCING GRAFT-MODIFIED COPOLYMERS

BACKGROUND OF THE INVENTION

1. Field of the Invention

The present invention relates to a method for producing graft-modified copolymers which are obtainable by subjecting an unsaturated copolymer comprising an α-olefin and a specific cyclic olefin and a radically polymerizable monomer to the radical polymerization conditions, and which are excellent in adhesion, printability, hydrophilicity, and compatibility in a polymer blend.

2. Related Art

Homopolymers of an α-olefin, which herein includes ethylene, and copolymers thereof are not only inexpensive but also excellent in mechanical strength, gloss, transparency, moldability, resistance to humidity, and resistance to chemicals, so that they are widely used either singly or as a component of a polymer blend. However, since the α-olefinic polymers have a non-polar molecular structure, they are poor in affinity for other materials and extremely inferior in adhesion, printability, and compatibility in a polymer blend.

In order to improve the above properties, a method in which a modified polymer is prepared by graft-polymerizing a radically polymerizable monomer to an α-olefinic polymer has long been attempted repeatedly.

However, such a radical grafting method still has a lot of problems. For example, this method cannot give a sufficiently high graft ratio or graft efficiency. Further, in most cases, a radical polymerization initiator such as an organic or inorganic peroxide is used in this method, so that a backbone polymer to which a monomer is grafted readily undergoes a molecular cleavage or a crosslinking reaction.

In order to solve the above problems, a variety of inventions have been proposed. Of these, those inventions which are disclosed in Japanese Laid-Open Patent Publications Nos. 98508/1982 and 269110/1990 are considered to be particularly related to the present invention. In these inventions, the graft ratio of a monomer is increased by restraining a backbone polymer from a molecular cleavage or crosslinking by making use of the reactivity of unsaturated bonds contained in an unsaturated copolymeric resin composed of an α-olefin and an unconjugated diene monomer.

However, the unsaturated copolymers for use in these inventions are prepared by using an unconjugated diene monomer which is not always highly copolymerizable. Further, from the viewpoints of the graft ratio of a monomer, the graft efficiency, a molecular cleavage of a backbone polymer, formation of gel in a radical graft reaction product and the like, it cannot be said that the radical graft reaction in which a monomer is grafted to such an unsaturated copolymeric resin has been practically perfected.

On the other hand, Japanese Patent Publication No. 19854/1971, and Japanese Patent Laid-Open Publication Nos. 241907/1987 and 87610/1989 disclose copolymers of an α-olefin, particularly propylene, with divinylbenzene. It is, however, afraid that the copolymers may contain a gel fraction formed during copolymerization and that the copolymers may not produce, upon modification, graft-derivatives endowed with desirable properties.

The foregoing prior art is useful in its own way. However, it is unsatisfactory in the graft efficiency and the like.

SUMMARY OF THE INVENTION

Objects of the present invention are to improve the adhesion, printability, hydrophilicity, and compatibility in a polymer blend of polyolefins, and to provide a method for producing a graft-modified polymer, which is free from the problems of the graft ratio of a monomer, the graft efficiency and a molecular cleavage of a backbone polymer, from an unsaturated copolymer consisting of an α-olefin and a specific cyclic olefin.

The present invention presents a method for producing a graft-modified copolymer which comprises a step of subjecting 100 parts by weight of an unsaturated copolymer which is obtainable by copolymerizing an α-olefin of 3 to 12 carbon atoms and a cyclic olefin having an alkylidene group or an alkenyl group, represented by the following formula (I), the concentration of the unit originating from the cyclic olefin in the unsaturated copolymer being from 0.05 to 50 mol %, and from 0.1 to 300 parts by weight of a radically polymerizable monomer to the radical polymerization conditions thereby to introduce a polymer chain formed from the radically polymerizable monomer:

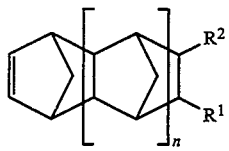

(I)

wherein $R^1$ represents an alkylidene group of 2 to 5 carbon atoms or an alkenyl group of 2 to 5 carbon atoms, $R^2$ represents a hydrocarbyl group of 1 to 5 carbon atoms or a hydrogen atom, and n is 0, 1 or 2.

The graft-modified copolymers according to the present invention are imparted with the properties which are attributed to the radically polymerizable monomer introduced, such as adhesion or dyability of various inks or paints, without the properties inherent to an α-olefinic polymer, such as excellent mechanical strength, transparency, moldability, resistance to chemicals and the like being impaired. Further, the copolymers according to the present invention have an improved affinity for other resins, so that they exhibit an excellent compatibilizing effect upon preparing a polymer blend.

The present invention basically comprises a step of introducing a branch polymer chain to an unsaturated copolymer of an α-olefin and a cyclic olefin by graft-modification which is conducted by utilizing the carbon-carbon double bond contained in an alkylidene or alkenyl group which is derived from the cyclic olefin. The modified copolymer obtained by the method of the invention is such that the graft ratio or efficiency of the monomer is sufficiently high, and that its backbone polymer is in the state of being satisfactorily restrained from a molecular cleavage and a crosslinking reaction.

DETAILED DESCRIPTION OF THE INVENTION

Unsaturated Copolymer to Be Modified

General Explanation

The unsaturated copolymer for use in the present invention is a novel polymer which is a copolymer of an α-olefin of 3 to 12, preferably 3 to 8, carbon atoms and a specific cyclic olefin represented by the above formula (I), the content of the cyclic olefin (I) being from 0.05 to 50 mol %, preferably from 0.1 to 30 mol %, more preferably from 0.3 to 10 mol %.

Further, it has been confirmed by $^1$H-NMR $^{13}$C-NMR and IR analyses that the cyclic olefin having the general formula (I) is existing in the unsaturated copolymer chiefly in the state as shown in the following formula (II):

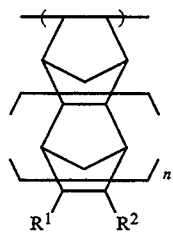
(II)

The unsaturated copolymer is a crystalline polymer. The crystallinity can be indicated by the degree of crystallization determined by X-ray diffractometry, which is 10% or more, preferably 20% or more, preferably no higher than approximately 70%.

It is noted that the unsaturated copolymer can further contain a small amount of a comonomer, that is, approximately 15 mol % at maximum, preferably 5 mol % at maximum, of the total amount of the above-described two monomers.

The molecular weight and/or the melting point of the unsaturated copolymer should be such that the copolymer can be defined as a resin. The molecular weight of the copolymer is 3,000 or more and 1,000,000 or less, preferably 5,000 or more and 500,000 or less, more preferably 8,000 or more and 300,000 or less, when expressed by a number-average molecular weight. Alternatively, the melting point of the copolymer is typically 40° C. or higher.

α-Olefin

Examples of the α-olefin of 3 to 12, preferably 3 to 8 carbon atoms, which is one of the constituents of the unsaturated copolymer, include propylene, 1-butene, 1-hexene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allylcyclopentane, allylcyclohexane, allylbenzene, 3-cyclohexyl-1-butene, vinylcyclopropane, vinylcyclohexane and 2-vinylbicyclo[2,2,1]-heptane. Of these α-olefins, propylene, 1-butene, 1-hexene, 3-methyl-1-butene, 3-methyl-1-pentene, 4-methyl-1-pentene and 3-methyl-1-hexene are preferred. Propylene, 1-butene, 3-methyl-1-butene and 4-methyl-1-pentene are particularly preferred, propylene being more preferred. These α-olefins can be used either singly or in combination of two or more. In particular, when the α-olefin is 1-hexene, it is preferable to use at least one of propylene, 1-butene, 4-methyl-1-pentene and 3-methyl-1-butene in combination. In the case where two or more types of the α-olefins are used, the α-olefins can be distributed either randomly or as block-wise in the resulting unsaturated copolymer.

Cyclic Olefin

The cyclic olefin for use in the present invention is a compound represented by the following general formula (I):

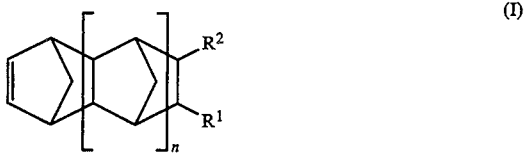
(I)

wherein $R^1$ represents an alkylidene or alkenyl group of 2 to 5 carbon atoms, $R^2$ represents a hydrocarbyl group of 1 to 5 carbon atoms or a hydrogen atom, and n represents 0, 1 or 2.

Examples of the alkylidene group of 2 to 5 carbon atoms, represented by $R^1$ include =CH(CH$_3$), =CH(CH$_2$CH$_3$), =CH(CH$_2$)$_2$CH$_3$, =C(CH$_3$)$_2$, =C(CH$_3$)(CH$_2$CH$_3$) and =C(CH$_2$CH$_3$)$_2$. Examples of the alkenyl group of 2 to 5 carbon atoms, represented by $R^1$ include —CH=CH$_2$, —CH$_2$—CH=CH$_2$, —CH$_2$—C(CH$_3$)=CH$_2$, —CH$_2$—CH=CH(CH$_3$), —CH$_2$—CH=C(CH$_3$)$_2$, —CH$_2$—CH$_2$—C(CH$_3$)=CH$_2$ and —CH$_2$—CH$_2$—CH=CH(CH$_3$).

Examples of the hydrocarbyl group of 1 to 5 carbon atoms, represented by $R^2$ include alkyl groups such as methyl, ethyl, propyl and butyl.

n is an integer of 2 at maximum, but preferably 0 or 1.

Specific examples of the cyclic olefin include those compounds which are shown in Table 1.

TABLE 1

| Compound No. | Chemical Formula | Name of Compound |
|---|---|---|
| 1 | 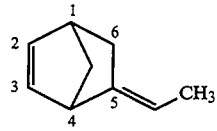 | 5-ethylidenebicyclo-[2,2,1]-hept-2-ene |
| 2 | 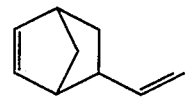 | 5-vinylbicyclo-[2,2,1]hept-2-ene |
| 3 | 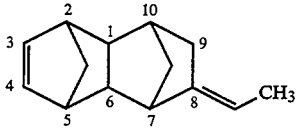 | 8-ethylidene-tetracyclo-[4,4,0,1$^{2,5}$,1$^{7,10}$]-3-dodecene |
| 4 | 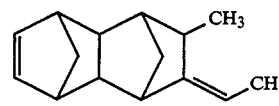 | 8-ethylidene-9-methyltetracyclo-[4,4,0,1$^{2,5}$,1$^{7,10}$]-3-dodecene |
| 5 | 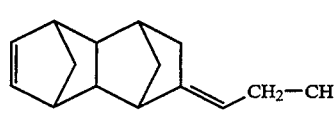 | 8-propylidene-tetracyclo-[4,4,0,1$^{2,5}$,1$^{7,10}$]-3-dodecene |

TABLE 1-continued

| Compound No. | Chemical Formula | Name of Compound |
|---|---|---|
| 6 | (structure with CH$_3$ and CH$_2$—CH$_3$ substituents) | 8-propylidene-9-methyltetracyclo-[4,4,0,1$^{2,5}$,1$^{7,10}$]-3-dodecene |
| 7 | (structure with two CH$_3$ substituents) | 8-isopropylidenetetracyclo-[4,4,0,1$^{2,5}$,1$^{7,10}$]-3-dodecene |
| 8 | (structure with CH$_3$, CH$_2$, CH$_3$ substituents) | 8-isopropylidene-9-methyl-tetracyclo-[4,4,0,1$^{2,5}$,1$^{7,10}$]-3-dodecene |
| 9 | (structure with vinyl substituent) | 8-vinyltetracyclo-[4,4,0,1$^{2,5}$,1$^{7,10}$]-3-dodecene |

Catalyst Used for Preparing Unsaturated Copolymer

The unsaturated copolymer for use in the present invention can be prepared by subjecting the above-described α-olefins and cyclic olefin to contact with a catalyst comprising components (A) and (B), thereby causing polymerization of the olefins. It is noted that the term "comprising" herein means that the components of the catalyst are not limited only to the above-described ones i.e. the components (A) and (B), and that other components which meet the objects of the invention are not excluded.

Component (A)

The component (A) is a transition-metal compound represented by the formula:

$$Q_a(C_5H_{5-a-b}R^3{}_b)(C_5H_{5-a-c}R^4{}_c)MeXY$$

In the above formula, Q is a bridge group which crosslinks two conjugated 5-membered cyclic ligands. Specific examples of the bridge group is as follows: (a) an alkylene group of 1 to 3, preferably 1 to 2 carbon atoms, or a divalent hydrocarbyl group which is a derivative of the alkylene group having a hydrocarbyl substituent and having 1 to 20 carbon atoms in total, such as a methylene group, an ethylene group, an isopropylene group, a phenylmethylmethylene group, a diphenylmethylene group and a cyclohexylene group; (b) a monosilylene or oligosilylene group such as disilylene group which may or may not have, as a substituting group thereon, a hydrocarbyl group of approximately 1 to 20 carbon atoms, preferably an alkyl group of 1 to 3 carbon atoms or a phenyl group, such as a silylene group, a dimethylsilylene group, a phenylmethylsilylene group, a diphenylsilylene group, a disilylene group and a tetramethyldisilylene group; and (c) a hydrocarbyl group of approximately 1 to 20 carbon atoms containing germanium, phosphorus, nitrogen, boron or aluminum, specifically, such groups as (CH$_3$)$_2$Ge, (C$_6$H$_5$)$_2$Ge, (CH$_3$)P, (C$_6$H$_5$)P, (C$_4$H$_9$)N, (C$_6$H$_5$)N, (CH$_3$)B, (C$_4$H$_9$)B, (C$_6$H$_5$)B, (C$_6$H$_5$)Al and (CH$_3$O)Al. Of these groups, an alkylene group and a silylene group are preferred. a is 0 or 1.

Conjugated 5-membered cyclic ligands represented by (C$_5$H$_{5-a-b}$R$^3{}_b$) and (C$_5$H$_{5-a-c}$R$^4{}_c$) are defined separately. However, the definitions of b and c, and the definitions of R$^3$ and R$^4$ are respectively the same (as described later in detail). It is therefore needless to say that these two conjugated 5-membered cyclic groups may be the same or different from each other. One specific example of this conjugated 5-membered cyclic group in which b=0 (or c=0) is a cyclopentadienyl group (having no substituting group thereon except the crosslinking group Q). In the case where the conjugated 5-membered cyclic group has a substituting group, that is, b≠0 (or c≠0) in the formula, a hydrocarbyl group preferably of C$_1$–C$_{20}$, more preferably of C$_1$–C$_{12}$ can be mentioned as a specific example of R$^3$ (or R$^4$). This hydrocarbyl group may be bound, as a monovalent group, to the cyclopentadienyl group; or when there is a plurality of the hydrocarbyl groups, two of them can be bound to each other at its opposite end and may form a ring together with part of the cyclopentadienyl group. The typical example of the latter case is that R$^3$ (or R$^4$) forms a fused 6-membered ring sharing a double bond in the cyclopentadienyl group, that is, the conjugated 5-membered cyclic ring group is an indenyl group or a fluorenyl group. Therefore, typical examples of this conjugated 5-membered cyclic group are substituted or unsubstituted cyclopentadienyl, indenyl and fluorenyl groups.

Besides the above-described hydrocarbyl group of C$_1$–C$_{20}$, preferably C$_1$–C$_{12}$, R$^3$ and R$^4$ individually represent a halogen group, e.g. fluorine, chlorine and bromine; an alkoxy group, e.g. a group of C$_1$–C$_{12}$; a silicon-containing hydrocarbyl group, e.g. a group of approximately 1 to 24 carbon atoms, containing a silicon atom in a manner of —Si(R$^5$)(R$^6$)(R$^7$); a phosphorus-containing hydrocarbyl group, e.g. a group of approximately 1 to 18 carbon atoms, containing a phosphorus atom in a manner of —P(R)(R); a nitrogen-containing hydrocarbyl group, e.g. a group of approximately 1 to 18 carbon atoms, containing a nitrogen atom in a manner of —N(R)(R'); or a boron-containing hydrocarbon radical, e.g. a group of approximately 1 to 18 carbon atoms, containing a boron atom in a manner of —B(R)(R). In the case where b (or c) is 2 or more, that is, there is plurality of R$^3$s (or R$^4$s), they may be the same or different from one another.

b and c individually represent an integer which can fulfill the conditions of 0≦b≦5 and 0≦c≦5 when a is 0, and the conditions of 0≦b≦4 and 0≦c≦4 when a is 1.

Me is a transition metal of the IVB group of the Periodic Table, selected from titanium, zirconium and hafnium. Titanium and zirconium are preferred, and zirconium is particularly preferred.

X and Y individually represent a hydrogen atom, a halogen atom, a hydrocarbyl group of 1 to 20, preferably 1 to 10 carbon atoms, an alkoxy group of 1 to 20, preferably 1 to 10 carbon atoms, an amino group, a nirogen-containing hydrocarbyl group of 1 to 20, a phosphorus-containing hydrocarbyl group of 1 to 20, preferably 1 to 12 carbon atoms, specifically, for example, a diphenylphosphine group, a diethylamino group, or a silicon-containing hydrocarbyl group of 1 to 20, preferably 1 to 12 carbon atoms, specifically, for example, a trimethylsilyl group. X and Y may be the same or different from each other. Of these, a halogen atom and a hydrocarbyl group are preferred. Particularly preferred is that both X and Y represent a halogen atom.

Specific examples of the component (A) include:
(1) bis(cyclopentadienyl)dimethylzirconium,
(2) bis(cyclopentadienyl)diethylzirconium,
(3) bis(cyclopentadienyl)methylzirconium monochloride,
(4) bis(cyclopentadienyl)ethylzirconium monochloride,
(5) bis(cyclopentadienyl)methylzirconium monobromide,
(6) bis(cyclopentadienyl)methylzirconium monoiodide,
(7) bis(cyclopentadienyl)zirconium dichloride,
(8) bis(cyclopentadienyl)zirconium dibromide,
(9) ethylenebis(cyclopentadienyl)zirconium dichloride,
(10) ethylenebis(cyclopentadienyl)methylzirconium monochloride,
(11) ethyienebis(cyclopentadienyl)dimethylzirconium,
(12) methylenebis(cyclopentadienyl)zirconium dichloride,
(13) propylenebis(cyclopentadienyl)zirconium dichloride,
(14) ethylenebis(indenyl)zirconium dichloride,
(15) ethylenebis(indenyl)zirconium monochloride monohydride,
(16) ethylenebis(indenyl)dimethylzirconium,
(17) ethylenebis(indenyl)diphenylzirconium,
(18) ethylenebis(indenyl)zirconium dibromide,
(19) ethylenebis(4,5,6,7-tetrahydro-1-indenyl)dimethylzirconium,
(20) ethylenebis(4,5,6,7-tetrahydro-1-indenyl)zirconium dichloride,
(21) ethylenebis(4-methyl-1-indenyl)zirconium dichloride,
(22) ethylenebis(2-methyl-1-indenyl)zirconium dichloride,
(23) ethylenebis(2,4-dimethyl-1-indenyl)zirconium dichloride,
(24) dimethylsilylenebis(cyclopentadienyl)dimethylzirconium,
(25) dimethylsilylenebis(cyclopentadienyl)zirconium dichloride,
(26) dimethylsilylenebis(methylcyclopentadienyl)-zirconium dichloride,
(27) dimethylsilylenebis(dimethylcyclopentadienyl)-zirconium dichloride,
(28) dimethylsilylenebis(indenyl)zirconium dichloride,
(29) dimethylsilylenebis(indenyl)zirconium monochloride monohydride,
(30) dimethylsilylenebis(indenyl)dimethylzirconium,
(31) dimethylsilylenebis(indenyl)diphenylzirconium,
(32) dimethylsilylenebis(indenyl)zirconium dibromide,
(33) dimethylsilylenebis(4,5,6,7-tetrahydro-1-indenyl)-dimylzirconium,
(34) dimethylsilylenebis(4,5,6,7-tetrahydro-1-indenyl)-zirconium dichloride,
(35) dimethylsilylenebis(4-methyl-1-indenyl)zirconium dichloride,
(36) dimethylsilylenebis(2-methyl-1-indenyl)zirconium dichloride,
(37) dimethylenebis(2,4-dimethyl-1-indenyl)zirconium dichloride,
(38) bis(cyciopentadienyl)dimethyltitanium,
(39) bis(cyclopentadienyl)methyltitanium monochloride,
(40) bis(cyclopentadienyl)titanium dichloride,
(41) ethylenebis(indenyl)titanium dichloride,
(42) ethylenebis(4,5,6,7-tetrahydro-1-indenyl)titanium dichloride,
(43) methylenebis(cyclopentadienyl)titanium dichloride,
(44) methylene(cyclopentadienyl)(3,4-dimethyicyclopentadienyl)zirconium dichloride,
(45) methylene(cyclopentadienyl)(3,4-dimethylcyclopentadienyl)zirconium chloride hydride,
(46) methylene(cyclopentadienyl)(3,4-dimethylcyclopentadienyl)zirconium dimethyl,
(47) methylene(cyclopentadienyl)(3,4-dimethylcyclopentadienyl)zirconium diphenyl,
(48) methylene(cyclopentadienyl)(trimethylcyclopentadienyl)zirconium dichloride,
(49) methylene(cyclopentadienyl)(tetramethylcyclopentadienyl)zirconium dichloride,
(50) isopropylidene(cyclopentadienyl)(3,4-dimethylcyclopentadienyl)zirconium dichloride,
(51) isopropylidene(cyclopentadienyl)(3-methylindenyl)zirconium dichloride,
(52) isopropylidene(cyclopentadienyl)-(fluorenyl)zirconium dichloride,
(53) isopropylidene(2-methylcyclopentadienyl)-(fluorenyl)zirconium dichloride,
(54) isopropylidene(2,5-dimethylcyclopentadienyl)(3',4'-dimethylcyclopentadienyl)zirconium dichloride,
(55) isopropylidene(2,5-dimethylcyclopentadienyl)-(fluorenyl)zirconium dichloride,
(56) ethylene(cyclopentadienyl)(3,4-dimethylcyclopentadienyl)zirconium dichloride,
(57) ethylene(cyclopentadienyl)(fluorenyl)zirconium dichloride,
(58) ethylene(2,5-dimethylcyclopentadienyl)-(fluorenyl)zirconium dichloride,
(59) ethylene(2,5-diethylcyclopentadienyl)-(fluorenyl)-zirconium dichloride,
(60) diphenylmethylene(cyclopentadienyl)(3,4-dimethylcyclopentadienyl)zirconium dichloride,
(61) diphenylmethylene(cyclopentadienyl)(3,4-diethylcyclopentadienyl)zirconium dichloride,
(62) cyclohexylidene(cyclopentadienyl)-(fluorenyl)zirconium dichloride,
(63) cyclohexylidene(2,5-dimethylcyclopentadienyl)-(3',4'-dimethylcyclopentadienyl)zirconium dichloride,
(64) dimethylsilylene(cyclopentadienyl)(3,4-dimethylcyclopentadienyl)zirconium dichloride,
(65) dimethylsilylene(cyclopentadienyl)-(trimethylcyclopentadienyl)zirconium dichloride,
(66) dimethyisilylene(cyclopentadienyl)-(tetramethylcyclopentadienyl)zirconium dichloride,
(67) dimethylsilylene(cyclopentadienyl)(3,4-diethylcyclopentadienyl)zirconium dichloride,
(68) dimethylsilylene(cyclopentadienyl)-(triethylcyclopentadienyl)zirconium dichloride,
(69) dimethylsilylene(cyclopentadienyl)-(tetraethylcyclopentadienyl)zirconium dichloride,
(70) dimethylsilylene(cyclopentadienyl)-(fluorenyl)zirconium dichloride,
(71) dimethylsilylene(cyclopentadienyl)(2,7-di-t-butylfluorenyl)zirconium dichloride,
(72) dimethylsilylene(cyclopentadienyl)-(octahydrofluorenyl)zirconium dichloride,
(73) dimethylsilylene(2-methylcyclopentadienyl)-(fluorenyl)zirconium dichloride,
(74) dimethylsilylene(2,5-dimethylcyclopentadienyl)-(fluorenyl)zirconium dichloride,

(75) dimethylsilylene(2-ethylcyclopentadienyl)-(fluorenyl)zirconium dichloride,
(76) dimethylsilylene(2,5-diethylcyclopentadienyl)-(fluorenyl)zirconium dichloride,
(77) dimethylsilylene(2-methylcyclopentadienyl)(2,7-di-t-butylfluorenyl)zirconium dichloride,
(78) dimethylsilylene(2,5-dimethylcyclopentadienyl)-(2,7-di-t-butylfluorenyl)zirconium dichloride,
(79) dimethylsilylene(2-ethylcyclopentadienyl)(2,7-di-t-butylfluorenyl)zirconium dichloride,
(80) dimethylsilylene(diethylcyclopentadienyl)(2,7-di-t-butylfluorenyl)zirconium dichloride,
(81) dimethyisilylene(methylcyclopentadienyl)-(octahydrofluorenyl)zirconium dichloride,
(82) dimethylsilylene(dimethylcyclopentadienyl)-(octahydrofluorenyl)zirconium dichloride,
(83) dimethylsilylene(ethylcyclopentadienyl)-(octahydrofluorenyl)zirconium dichloride,
(84) dimethylsilylene(diethylcyclopentadienyl)-(octahydrofluorenyl)zirconium dichloride,
(85) dimethylgermane(cyclopentadienyl)(fluorenyl)-zirconium dichloride,
(86) phenylamino(cyclopentadienyl)(fluorenyl)-zirconium dichloride, and
(87) phenylalumino(cyclopentadienyl)(fluorenyl)-zirconium dichloride.

Component (B)

The component (B) is an alumoxane. An alumoxane which is preferably used in the present invention is an organoaluminum compound represented by the following formula (III) or (IV):

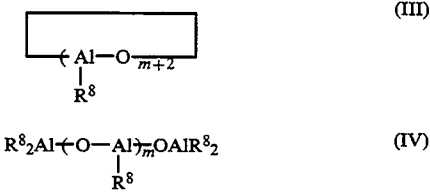

In the above general formulas, $R^8$s independently represent an alkyl group of 1 to 5 carbon atoms, for example, a methyl group, an ethyl group, a propyl group or a butyl group, and a methyl group is particularly preferred. m is an integer of 2 or more, preferably 4 or more and 100 or less.

The component (B) is a product which is obtained from one species of a trialkylaluminum, or two or more species of a trialkylaluminum through reaction with water. Specific examples of the component (B) include (a) methylalumoxane, ethylalumoxane, propylalumoxane, butylalumoxane and isobutylalumoxane, which are obtained from one species of a trialkylaluminum; and (b) methylethylalumoxane, methylbutylalumoxane and methylisobutylalumoxane, which are obtained by reacting two species of a trialkylaluminum with water. Of these alumoxanes, methylalumoxane is particularly preferred.

It is also possible to use a plurality of the alumoxanes in combination selected within one of the above groups or between the groups. Further, they can also be used along with other alkylaluminum compound such as trimethylaluminum, triethylaluminum, triisobutylaluminum or dimethylaluminum chloride.

These alumoxanes can be prepared under a variety of the known conditions. Specifically, the following manners can be mentioned:

(a) the manner in which a trialkylaluminum is directly reacted with water by using a proper organic solvent such as toluene, benzene or ether;

(b) the manner in which a trialkylaluminum is reacted with a salt hydrate containing water of crystallization, for instance, copper sulfate or aluminum sulfate;

(c) the manner in which a trialkylaluminum reacted with water with which silica gel or the like has been impregnated;

(d) the manner in which trimethylaluminum and triisobutylaluminum are mixed, and the resulting mixture is directly reacted with water by using a proper organic solvent such as toluene, benzene or ether;

(e) the manner in which trimethylaluminum and triisobutylaluminum are mixed, and the resulting mixture is subjected to a heat reaction with a salt hydrate containing water of crystallization, for instance, copper sulfate or aluminum sulfate;

(f) the manner in which silica gel or the like is impregnated with water, and the resultant is subjected to a treatment with triisobutylaluminum, followed by a further treatment with trimethylaluminum; and (g) the manner in which methylalumoxane and isobutylalumoxane are synthesized respectively by a known method, and these two components are mixed in a predetermined proportion and subjected to a reaction under heat.

Of the above manners, the manner (a) is preferred.

Preparation of Unsaturated Copolymer

Copolymerization of the α-olefin and the cyclic olefin is usually carried out in a hydrocarbon solvent. Specific examples of the hydrocarbon solvent include aliphatic hydrocarbons such as hexane, heptane, octane, decane, cyclohexane and kerosene, and aromatic hydrocarbons such as benzene, toluene and xylene. These hydrocarbons can be used either singly or as a mixture.

A liquid phase polymerization method such as a suspension polymerization method or a solution polymerization method or a gas phase polymerization method can be adopted as a polymerization method. The polymerization temperature is from −60° to 150° C., preferably from −30° to 80° C. The polymerization pressure is usually from 0 to 50 kg/cm², preferably from 0 to 30 kg/cm². In the present invention, hydrogen can be used in order to control the molecular weight of the copolymer.

The concentration of the transition metal atom, which is used as a catalytic component in the copolymerization, in a hydrocarbon solvent is from $10^{-5}$ to 1 mg atom/liter, preferably from $10^{-4}$ to $10^{-1}$ mg atom/liter. Further, the concentration of the alumoxane in a hydrocarbon solvent, calculated for an aluminum atom, is from $10^{-1}$ to $10^2$ mg atom/liter, preferably from $5\times10^{-1}$ to $5\times10$ mg atom/liter After the polymerization reaction is completed, the polymerization reaction mixture is treated by a conventional method, whereby an unsaturated olefinic copolymer can be obtained.

Graft Modification of Unsaturated Polymer

In the present invention, the above-obtained unsaturated copolymer is subjected to graft-modification, thereby introducing a branch polymer chain thereto.

A monomer to be graft-polymerized to the unsaturated copolymer is a compound which can be either homopolymerized or copolymerized in a radical mechanism. Examples of such a monomer include vinyl monomers, vinylidene monomers, α,β-unsaturated carboxylic acid and derivatives thereof.

Specific examples of the above monomers include: (a) styrene monomers, for examples, unsubstituted or nuclear-and/or side-chain-substituted styrenes, where the substituting group is a halogen atom, a lower alkyl group, a halo-lower alkyl group or the like, particularly styrene, nuclear-substituted styrenes such as methylstyrene, dimethylstyrene, ethylstyrene, isopropylstyrene, chlorostyrene and chloromethylstyrene, and α-substituted styrenes such as α-methylstyrene and α-ethylstyrene; (b) vinyl halides and vinylidene halides, such as, for instance, vinyl chloride, vinyl bromide, vinylidene chloride and vinylidene bromide; (c) unsaturated nitriles, such as, for instance, acrylonitrile and methacrylonitrile; (d) vinyl esters, such as, for instance, vinyl acetate; (e) basic or nitrogen-containing monomers, such as, for instance, vinylcarbazole, vinylpyridine and vinylpyrrolidone; (f) unsaturated ketones, such as, for instance, methyl vinyl ketone; (g) aromatic monomers except styrene, such as, for instance, vinylnaphthalene and allylbenzene; (h) conjugated dienes, such as, for instance, butadiene, isoprene and chloroprene; and (i) unsaturated carboxylic acid and derivatives thereof, such as, for instance, acrylic acid, methacrylic acid, maleic acid, fumaric acid, iraconic acid, citraconic acid, hymic acid, crotonic acid, esters thereof where the alcohol component is of approximately 1 to 10 carbon atoms, and includes glycidyl alcohol, halohydrin and ether alcohol, anhydrides thereof, metallic salts thereof, amides thereof and imides thereof.

Of these, preferably used are styrene, α-methylstyrene, vinyl chloride, acrylonitrile, vinyl acetate, an acrylic, methacrylic, maleic or fumaric acid ester whose alcohol component has an alkyl group of 1 to 8, preferably 1 to 4, carbon atoms, glycidyl acrylate, glycidyl methacrylate, alkyl (of 1-8 carbon atoms) glycidyl maleate, alkyl (of 1-8 carbon atoms) glycidyl fumarate, 2-hydroxyethyl methacrylate, 2-hydroxypropyl methacrylate, maleic anhydride and the like. More preferable are styrene, maleic anhydride, glycidyl methacrylate and methylacrylate. In particular, those monomers which belong to unsaturated carboxylic acid and derivatives thereof mentioned in the group (i) are preferably used.

These monomers are used either singly or in combination of two or more monomers selected within one of the above groups or between any of the groups. Unsaturated carboxylic acid and derivatives thereof are often used together with other monomers.

The amount of the monomer to be used is from 0.1 to 300 parts by weight, preferably from 1 to 200 parts by weight, and more preferably from 1 to 50 parts by weight per 100 parts by weight of the unsaturated copolymer. In the case where the amount of the monomer is less than 0.1 parts by weight, almost no improving effects of the present invention may be obtained. On the other hand, when the amount of the monomer is in excess of 300 parts by weight, the mechanical properties of the unsaturated copolymeric resin are scarcely revealed.

Production of Graft-Modified Copolymer

The graft-modified copolymer according to the present invention can be produced by subjecting the unsaturated copolymer and the above-described radically polymerizable monomer to the conventionally known conditions for radical graft polymerization. For example, any of the following methods can be adopted in the present invention: the method in which both of the unsaturated copolymer and the radically polymerizable monomer is irradiated with such as γ-rays or an electron beam; the method in which after the unsaturated copolymer is irradiated with radiation, the radically polymerizable monomer is contacted with the copolymer; and the method in which the unsaturated copolymer and the radically polymerizable monomer are in contact with each other in a dissolved, melted, dispersed or impregnated state, and graft polymerization is carried out in the presence or absence of a radical polymerization catalyst. Polymerization carried out in an impregnated state (impregnation polymerization) herein refers to polymerization which is conducted by dispersing an unsaturated copolymer which is in a particulate state, preferably in the state of powder or pellets, in water, and impregnating the dispersed unsaturated copolymer with a radical polymerization catalyst and a radically polymerizable monomer which have once been dispersed in the water.

Of these methods, preferable one is the method in which the unsaturated copolymer in a fluid state, that is, in the state of solution or molten state, or the unsaturated copolymer (and the radically polymerizable monomer) in the above-described impregnated state is contacted with the radically polymerizable monomer, and they are graft-polymerized in the presence or absence of a radical polymerization catalyst.

Examples of a solvent which can be used in the above graft polymerization include (a) aromatic hydrocarbon solvents such as benzene, toluene and xylene; (b) aliphatic hydrocarbon solvents such as pentane, hexane, heptane, octane, nonane and decane; (c) alicyclic hydrocarbon solvents such as cyclohexane, methylcyclohexane and decahydronaphthalene; and (d) chlorinated hydrocarbon solvents such as chlorobenzene, dichlorobenzene, trichlorobenzene, methylene chloride, chloroform, carbon tetrachloride and tetrachloroethylene. A solvent is properly selected from the above-enumerated solvents depending on the radically polymerizable monomer used, the polymerization conditions and the like.

The above graft polymerization can also be carried out without using any solvent, or in a melted state in the presence of a small amount of a solvent, for example, 30 parts by weight or less per 100 parts by weight of the unsaturated copolymer.

Examples of the radical polymerization catalyst or initiator include organic and inorganic peroxides such as benzoyl peroxide, t-butyl peroxybenzoate, dicumyl peroxide, t-butyl hydroperoxide, t-butyl peroxyacetate, diisopropylperoxy dicarbonate, 2,2-bis(t-butylperoxy)octane, methyl ethyl ketone peroxide, potassium peroxide and hydrogen peroxide; and azo compounds such as α,α'-azobisisobutyronitrile. The peroxides can act as redox type catalysts when they are used in combination with a reducing agent. For example, the combination of hydrogen peroxide and ferrous salt can be mentioned as redox catalyst.

A radical polymerization catalyst is properly selected from the above-enumerated ones in consideration of the type of monomers used and that of polymerization method adopted. The above catalysts can be used either singly or in combination of two or more.

The temperature of the radical graft polymerization reaction is usually in the range of 30° to 350° C., preferably 50° to 300° C., and the polymerization time is in the range of 30 seconds to 50 hours, preferably 30 seconds to 24 hours.

The amount of the radical polymerization catalyst to be used is properly selected from the range of 0 to 100 parts by weight, preferably 0 to 30 parts by weight per 100 parts by weight of the unsaturated copolymer.

When it is necessary to control the molecular weight of the polymer formed from the radically polymerizable monomer, any molecular weight modifying method which is usually employed in radical polymerization can be adopted. For instance, the purpose can be attained by changing the polymerization temperature, the amount of the radical polymerization catalyst added or the amount of the monomers used, or by adding a molecular weight modifier such as a mercaptan or 2,4-diphenyl-4-methyl-1-pentene.

Graft-Modified Copolymer

The graft copolymerization in the present invention corresponds to polymerization in which a monomer that will give a "branch" polymer is polymerized in the presence of a "backbone" polymer, and it is often confirmed that a polymer of the monomer itself which has failed to attend to the formation of the "branch" polymer is also produced as a by-product along with a copolymer having an ideal backbone-branch structure. Therefore, the "graft-modified copolymer" of the present invention also includes a mixture containing such a by-product. This is the reason why the present invention is defined by the expressions of "subjecting ... to radical polymerization conditions" and "graft-modified copolymer".

EXAMPLES

Production Example 1 of Unsaturated Copolymer

Synthesis of Ethylenebis(indenyl)zirconium Dichloride

In a 300-ml glass flask thoroughly purged with nitrogen, 5.16 g of bis(indenyl)ethane and 150 ml of tetrahydrofuran were charged, and the mixture was then cooled to a temperature of -78° C. To this mixture, 25 ml (concentration: 1.6 mole/liter) of butyllithium manufactured by Aldrich Corp. was added dropwise over one hour. The mixture was gradually heated to the reflux temperature, and then refluxed for two hours.

On the other hand, 100 ml of tetrahydrofuran was charged in a 200-ml glass flask thoroughly purged with nitrogen and was cooled to a temperature of −78° C. To this was added 4.7 g of zirconium tetrachloride, and the mixture was gradually heated to room temperature. The whole quantity of this zirconium tetrachloride solution was added to the above-prepared lithium salt of the bis(indenyl)zirconium in solution at a temperature of 0° C. Thereafter, the mixture was heated to the reflux temperature, and a reaction was carried out at the temperature for 16 hours. The yellow solid product was filtered off, washed with methanol, and then dried under reduced pressure. Thus, 1.9 g of ethylenebis(indenyl)zirconium dichloride was obtained.

Alumoxane

Methylalumoxane (polymerization degree: 20) manufactured by Toso-Akzo Co., Ltd., Japan, was used.

Polymerization

An induction stirring type autoclave made of stainless steel, having an internal volume of 1 liter was thoroughly dried, and then thoroughly purged with dried propylene. 500 ml of purified toluene and 1.5 ml of 5-vinylbicyclo[2,2,1]-hept-2-ene were charged in the autoclave under a stream of propylene gas. Thereafter, the methylalumoxane in an amount of 3.3 mg atom calculated in terms of an aluminum atom, and the ethylenebis(indenyl)zirconium dichloride in an amount of $1.1 \times 10^{-3}$ g atom calculated in terms of a zirconium atom were added at room temperature to the autoclave in this order. The autoclave was pressurized to 5 kg/cm$^2$G by propylene gas, and copolymerization was carried out at a temperature of 40° C. for two hours. After the polymerization, the remaining gas was purged, and the polymer solution was poured in a large quantity of methanol to precipitate a polymer.

The polymer was then dried at a temperature of 80° C. under reduced pressure, whereby 48.4 g of a copolymer was obtained. The polymerization activity per a unit zirconium was 22,000 g polymer/mg atom Zr-hr. The 5-vinylbicyclo[2,2,1]hept-2-ene content of the polymer obtained was determined to be 0.5 mol % by 13C—NMR analysis, the number-average molecular weight (Mn) of the polymer obtained was 29,000 when calculated in terms of polystyrene, and the weight-average molecular weight (Mw) was 60,900. The tacticity determined by NMR was such that mm was 92.3%, mr was 6.6% and rr was 1.1%. This copolymer is referred to as resin A.

Production Example 2 of Unsaturated Copolymer

The procedure of Production Example 1 of Unsaturated Copolymer was repeated except that 1.5 ml of a cyclic olefin, Compound No. 3 shown in Table 1, was used, whereby 58.9 g of a copolymer was obtained. The polymerization activity was found to be 26,800 g polymer/mg atom Zr.hr. The comonomer content, Mn, Mw, mm, mr and rr of the polymer obtained were 0.5 mol %, 30,000, 59,000, 93.1%, 5.6% and 1.3%, respectively. This copolymer is referred to as resin B.

Production Example 3 of Unsaturated Copolymer

Preparation of Catalyst with Carrier

In a 0.4-liter ball mill pot thoroughly dried and purged with nitrogen, 40 balls made of stainless steel, having a diameter of 12 mm were placed. 20 g of MgCl$_2$ and 8.8 ml of phthalic acid dichloride were introduced to the ball mill pot, and pulverized by rotating the pot for 48 hours. After the pulverization, the pulverized composition was taken out from the ball mill pot in a dry box. Subsequently, 8.8 g of this pulverized composition was placed in a flask thoroughly purged with nitrogen. To this were further introduced 25 ml of n-heptane and 25 ml of TiCl$_4$, and a reaction was carried out at a temperature of 100° C. for 3 hours. After the reaction, the reaction mixture was thoroughly washed with n-heptane. A portion of the solid component [component (i)] thus obtained was taken out and subjected to compositional analysis. As a result, the content of Ti was found to be 3.01% by weight.

50 ml of n-heptane thoroughly purified was introduced to a flask thoroughly purged with nitrogen. To this were introduced 5 g of the above-obtained component (i) and then 1.1 ml of (CH$_3$)$_3$CSi(CH$_3$)(OCH$_3$)$_2$, component (ii). These two components were kept in contact with each other at a temperature of 30° C. for 2 hours. After this, the reaction mixture was thoroughly washed with n-heptane to give a catalyst with a carrier, component (A).

Preparation of Copolymer

A 1-liter autoclave was replaced with propylene, and then charged with 260 ml of n-heptane. To this were introduced 0.9 g of triethylaluminum and 0.16 g of the above-obtained catalyst with a carrier in this order. Subsequently, 250 Nml of hydrogen was added to the mixture, and propylene was then introduced under pressure. The mixture was stirred at a temperature of 50° C. at a gauge pressure of 0.5 kg/cm$^2$G. The amount of a polymer produced during this stage was 5.1 g. Thereafter, 20 ml of 7-methyl-1,6-octadiene was further added to the reaction mixture, and the temperature of the mixture was raised while introducing propylene under pressure. Polymerization was carried out while maintaining the system at 65° C. and at 5 kg/cm$^2$G. After the catalyst was inactivated by n-butanol added thereto, the catalytic residue was extracted with water, and a copolymer was collected by centrifugation and dried. The amount of the copolymer powder thus obtained was 153 g, and the bulk density thereof was 0.47 g/cc.

The Mn and the Mw of the copolymer obtained were 24,000 and 150,000, respectively. Further, it was also found by NMR analysis that the content of the 7-methyl-1,6-octadiene was 0.6 mol %, that no polymer chain solely made of this diene monomer unit was contained in the copolymer and that the diene was comprised in the copolymer through 1,2-addition. This resin is referred to as resin C.

EXAMPLE 1

10 g of the resin A and 2 g of maleic anhydride were added to 200 ml of chlorobenzene, and the mixture was heated to a temperature of 110° C. while stirring into a solution. To this solution, 1 g of benzoyl peroxide dissolved in 30 ml of chlorobenzene was added dropwise over two hours, and a reaction was carried out at a temperature of 110° C. for 3 hours. The resulting reaction mixture was poured into a large amount of cooled acetone to precipitate a polymer. The polymer was separated by filtration, washed, and then dried under reduced pressure, whereby a graft-modified copolymer was obtained.

It was found by IR spectroscopy that the maleic anhydride content of the graft-modified copolymer was 0.89 mol %. The graft-modified copolymer was placed in a 80-mesh wire net bag, and dipped in boiling xylene for 8 hours for extraction. As a result, no insoluble matter was obtained.

EXAMPLE 2

10 g of the resin B and 10 g of glycidyl methacrylate were added to 200 ml of chlorobenzene, and the mixture was heated to a temperature of 110° C. while stirring into solution. To this solution, 3 g of benzoyl peroxide dissolved in 30 ml of chlorobenzene was added dropwise over two hours, and a reaction was carried out at a temperature of 110° C. for 3 hours. The resulting reaction mixture was poured into a large amount of cooled acetone to precipitate a polymer. The polymer was separated by filtration, washed, and then dried under reduced pressure, whereby a graft-modified copolymer was obtained.

It was found by NMR spectroscopy that the glycidyl methacrylate content of the graft-modified copolymer was 0.5 mol %, and that all of the double bonds in the resin B had disappeared.

44 g of the resin B, 4.4 g of methyl acrylate and 0.084 g of dicumyl peroxide were melted and kneaded by a Brabender Plastograph at 200° C. and at 60 rpm for 10 minutes, thereby obtaining a graft-modified copolymer.

5 g of the product thus obtained was dissolved in 100 ml of boiling xylene, reprecipitated in a large amount of cooled tetrahydrofuran, separated by filtration, washed, and then dried under reduced pressure, whereby the graft-modified copolymer purified was obtained.

It was found by IR spectroscopy that the methyl acrylate content of the graft-modified copolymer was 0.21 mol %.

EXAMPLE 4

In an autoclave with an internal volume of 1 liter were placed 495 ml of pure water, 9.9 g of calcium phosphate as a suspending agent, and 0.016 g of sodium dodecylbenzenesulfonate as a suspension aid. To this mixture, 50 g of the resin A which had been pelleted by a single-screw extruder (20 mm$\phi$) at a temperature of 230° C. was added, and suspended under stirring.

To this suspension, a solution prepared by dissolving 0.1 g of t-butyl peroxybenzoate as a radical polymerization catalyst in 25 g of styrene was added. The inner temperature of the autoclave was raised to 90° C. while stirring the mixture, and the unsaturated copolymer resin pellets were impregnated with the styrene containing the radical polymerization catalyst at this temperature maintained for one hour. Thereafter, the inner temperature of the autoclave was raised to 105° C., and polymerization was carried out at this temperature maintained for 1 hour. The inner temperature was then further raised to 140° C., and the polymerization was completed at this temperature maintained for one hour.

The autoclave was cooled to room temperature, and then the content thereof was taken out. Nitric acid was added to it until the pH of its aqueous phase became 2.5. The mixture was thoroughly stirred, and the resulting graft-modified copolymer resin was separated by filtration, washed, and then dried under reduced pressure.

3 g of the graft-modified copolymer resin thus obtained was dissolved in 100 ml of hot xylene, reprecipitated in a large amount of methyl ethyl ketone, separated by filtration, washed, and then dried under reduced pressure, whereby the graft-modified copolymer purified was obtained.

It was found by IR spectroscopy that the styrene content of the graft-modified copolymer was 20.5 wt %.

EXAMPLE 5

In a 300-ml flask thoroughly purged with nitrogen were placed 20 g of the resin A, 1 ml of toluene, 4 g of maleic anhydride, and 200 mg of dibenzoyl peroxide. The mixture was stirred at room temperature for one hour under a stream of nitrogen at 100 revolutions per minute. The temperature of the mixture was then raised to 100° C., and a reaction was carried out for 4 hours while stirring. After the reaction, the reaction mixture was dissolved in xylene. The mixture was poured into acetone to precipitate a polymer which was then separated by filtration and dried.

The maleic anhydride content in the dried polymer was determined by IR spectroscopy. As a result, it was found that 0.91 wt % of the maleic anhydride had been grafted.

Comparative Example 1

The procedure of Example 1 was repeated except that the resin C was used in place of the resin A in Example 1. As a result, there was obtained a graft-modified copolymer whose maleic anhydride content determined by IR spectroscopy was 0.70 mol %. The boiling-xylene-insoluble matter of the graft-modified copolymer was measured in the same manner as in Example 1. As a result, the insoluble matter was 3.7 wt %.

Comparative Example 2

The procedure of Example 3 was repeated except that the resin C was used in place of the resin B in Example 3. As a result, there was obtained a graft-modified copolymer whose methyl acrylate content determined by IR spectroscopy was 0.13 mol %.

Application Example 1

The graft-modified copolymer obtained in Example 1, a polypropylene resin ("MA 8" (Trademark) manufactured by Mitsubishi Petrochemical Co., Ltd.) and polybutylene terephthalate ("Novadol 5010" (Trademark) manufactured by Mitsubishi Chemical Industries, Ltd.) in the formulation shown in Table 2 were melted and kneaded by a plastomill with an internal volume of 60 ml, manufactured by Toyo Seiki Seisaku-Sho, Ltd., Japan, at 230° C., at 180 rpm for 6 minutes. The physical properties of the resin composition thus obtained were evaluated by the following methods. The results are shown in Table 2.

Methods for Measurement and Evaluation

(1) Flexural Modulus

A test piece with a width of 25 mm and a length of 80 mm was prepared by cutting work, and the flexural modulus of the test piece was measured by an Instron tester in accordance with JIS K7203.

(2) Izod Impact Strength

A test piece with a length of 31.5 mm, a width of 6.2 mm and a thickness of 3.2 mm was prepared by injection molding, and the notched Izod impact strength of the test piece was measured by a Minimax Izod Impact Strength Tester, Type CS-138TI manufactured by Custom Scientific Corporation.

TABLE 2

| Test Piece No. | (1) | (2) |
|---|---|---|
| Amount of Polypropylene ("MA8") (parts by weight) | 50 | 30 |
| Amount of Graft-Modified Copolymer (Example 1) (parts by weight) | 0 | 20 |
| Amount of Polybutylene Terephthalate ("Nov. 5010") (parts by weight) | 50 | 50 |
| Izod Impact Strength (kg · cm/cm$^2$) | 13.8 | 35.1 |
| Flexural Modulus (kg/cm$^2$) | 16,900 | 17,500 |

What is claimed is:

1. A method for producing a graft-modified copolymer comprising subjecting:
   100 parts by weight of an unsaturated copolymer which has a number average molecular weight of 3,000–1,000,000; and
   from 0.1 to 300 parts by weight of a radically polymerizable monomer selected from the group consisting of vinyl monomers, vinylidene monomers, alpha, beta-unsaturated carboxylic acids and derivatives thereof to radical polymerization conditions thereby to introduce a polymer chain formed from said radically polymerizable monomer;
   wherein said unsaturated copolymer is obtained by copolymerizing propylene and a cyclic olefin selected from the group consisting of 5-vinylbicyclo[2,2,2]hept-2-ene and 8-ethylidenetetracyclo[4,4,0,1$^{2,5}$,1$^{7,10}$]-3-dodecene, the concentration of a repeating unit originating from said cyclic olefin in said unsaturated copolymer being from 0.05 to 50 mol %.

2. The process as claimed in claim 1, wherein the content in the unsaturated copolymer of the cyclic olefin copolymerized therein is 0.1 to 30 mol %.

3. The process as claimed in claim 1, wherein the content in the unsaturated copolymer of the cyclic olefin copolymerized therein is 0.3 to 10 mol %.

4. The process as claimed in claim 1, wherein the unsaturated copolymer has a degree of crystallization upon analysis by X-ray diffractometry of at least 10%.

5. The process as claimed in claim 1, wherein the unsaturated copolymer has a degree of crystallization upon analysis by X-ray diffractometry of at least 20%.

6. The process as claimed in claim 1, wherein the unsaturated copolymer has a number-average molecular weight of 5,000 to 500,000.

7. The process as claimed in claim 1, wherein the unsaturated copolymer has a number-average molecular weight of 8,000 to 300,000.

8. The process as claimed in claim 1, wherein the unsaturated copolymer has a melting point of at least 40° C.

9. The process as claimed in claim 1, wherein the radically polymerizable monomer is selected from the group consisting of styrene, α-methylstyrene, vinyl chloride, acrylonitrile, vinyl acetate, methacrylic, maleic acid ester and a fumaric acid ester.

10. The process as claimed in claim 1, wherein the radically polymerizable monomer is selected from the group consisting of styrene, maleic anhydride, glycidyl methacrylate and methyl acrylate.

11. The process as claimed in claim 1, wherein the amount of the radically polymerizable monomer is 1 to 200 parts by weight per 100 parts by weight of the unsaturated copolymer.

12. The process as claimed in claim 1, wherein the amount of the radically polymerizable monomer is 1 to 50 parts by weight per 100 parts by weight of the unsaturated copolymer.

13. The process as claimed in claim 1, wherein the radical polymerization takes place so that the unsaturated copolymer is in a fluid state in that it is in solution or molten.

14. The process as claimed in claim 1, wherein the radical polymerization takes place so that the unsaturated copolymer, which is in a particulate state is impregnated with the radically polymerizable monomer which is polymerized within the unsaturated copolymer in a particulate state.

15. The process as claimed in claim 1, wherein the unsaturated copolymer is such that the cyclic olefin is copolymerized therein to form a unit of:

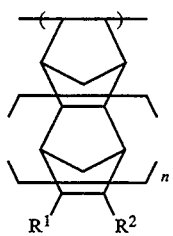

wherein n is 0, $R^1$ is —CH=$CH_2$ and $R^2$ is H; or n is 1, $R^1$ is =CH—$CH_3$ and $R^2$ is H.

16. The process of claim 1, wherein the radically polymerizable monomer is maleic anhydride.

17. The process of claim 1, wherein the radically polymerizable monomer is glycidyl methacrylate.

18. The process of claim 1, wherein the radically polymerizable monomer is methylacrylate.

19. The process of claim 1, wherein the radically polymerizable monomer is styrene.

* * * * *